Aug. 27, 1957  J. DE MONTREMY  2,804,001
AUTOMATIC PHOTOGRAPHIC CAMERAS HAVING MULTIPLE LENSES
Filed Aug. 10, 1954  5 Sheets-Sheet 1

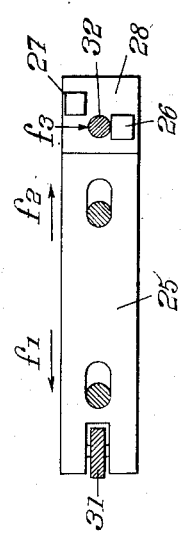
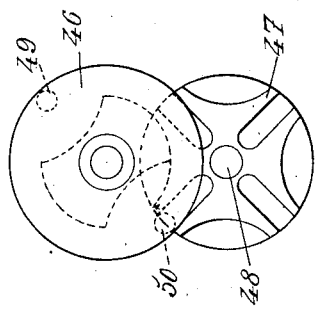
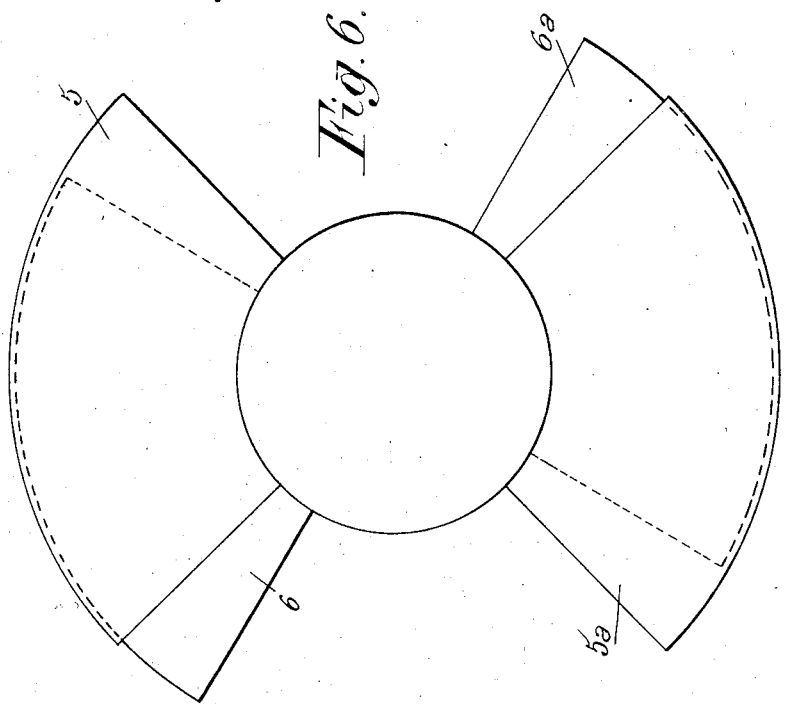

United States Patent Office 2,804,001
Patented Aug. 27, 1957

2,804,001

AUTOMATIC PHOTOGRAPHIC CAMERAS HAVING MULTIPLE LENSES

Jean de Montremy, Paris, France

Application August 10, 1954, Serial No. 448,899

Claims priority, application France August 21, 1953

4 Claims. (Cl. 95—18)

The present invention relates to automatic photographic cameras having several lenses so as to take several simultaneous pictures, said apparatus being in particular used on board of aircraft for photogrammetry and being therefore given in this case a field as large as possible.

The chief object of my invention is to provide an apparatus of this kind which is better adapted to meet the requirements of practice than those used up to the present time.

It consists chiefly in providing a single rotary shutter for simultaneously taking exposures through the respective lenses and preferably in distributing said lenses in a regular fashion concentrically with respect to the axis of rotation of the shutter, that is to say at angular intervals of $$\frac{360°}{n}$$

if there are $n$ lenses, the shutter having $n$ blades and rotating through an angle of $$\frac{360°}{n}$$

every time a set of pictures is taken.

According to another feature, the various operations necessary in an apparatus of the kind above referred to and in particular the resetting of the spring which drives the shutter, the lifting of the film pressing means, the release of the shutter and the possibly accessory operations such as the switching on of a lamp and/or the operation of a counter, are performed by a camshaft driven through suitable speed reducing means by a motor running at a uniform speed.

A third feature of my invention consists, in order to obtain a rotary movement only during one half of the cycle between two successive exposures, said rotary motion being intended for instance to reset the shutter driving spring and to move the film forward, in obtaining this movement from a Maltese cross the driving plate of which, having a uniform speed of revolution in the course of said cycle, carries two pins engaged in grooves of said Maltese cross for driving it.

Preferred embodiments of my invention will be hereinafter described with reference to the accompanying drawings, given merely by way of example and in which:

Fig. 6 is a plan view of the shutter of the apparatus.

Fig. 7 shows a part of the shutter control means.

Fig. 8 shows the Maltese cross for resetting the shutter spring.

Figure 1:
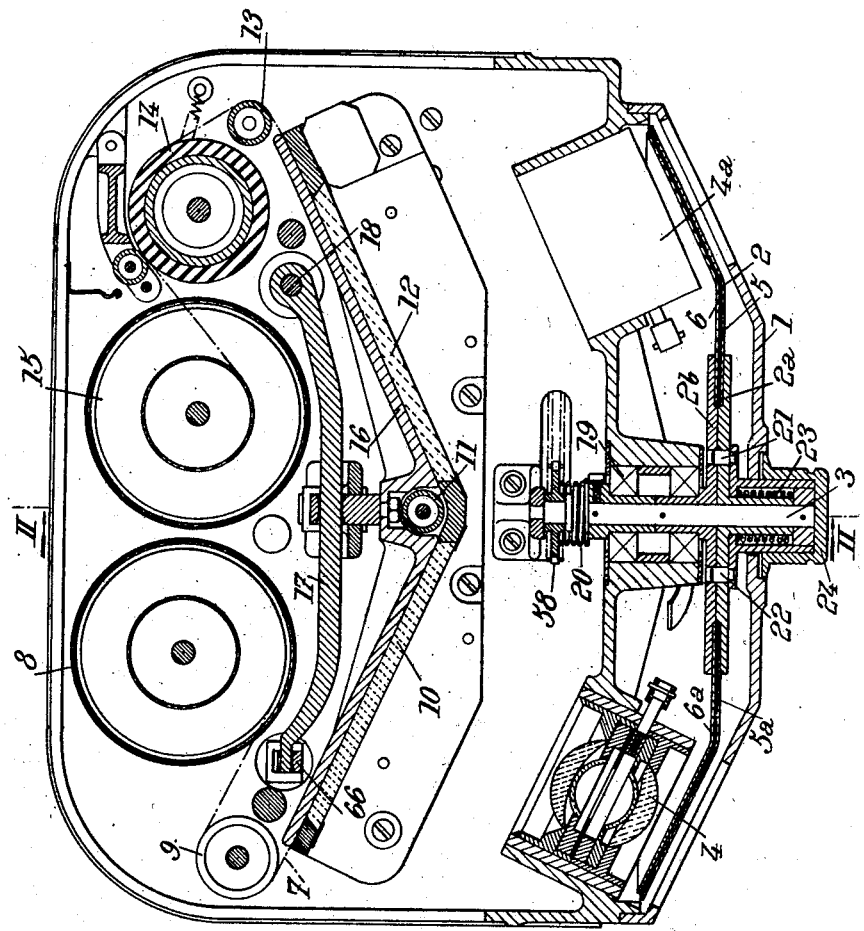
Fig. 1 is a vertical sectional view on the line I—I of Fig. 2 of a photographic camera made according to my invention.

The following detailed description with reference to the drawings relates to the case of an automatic photographic camera having two lenses.

As exposure through the two lenses is to take place simultaneously, the apparatus includes a single shutter 2 rotating about a pivot shaft 3 mounted in the casing 1 of the apparatus (1a being a removable cover). My invention may be applied to a camera having any number of lenses and these lenses are disposed concentrically and at regular angular intervals with respect to the axis of rotation of the shutter. In the present case since there are only two lenses, these lenses are disposed symmetrically with respect to said axis as shown at 4 and 4a (only one of these lenses being shown in section). Thus, when the shutter is at rest the two blades thereof are located in front of the lenses respectively. When the shutter is operated for an exposure through each of the two lenses, it is turned through 180° and the two blades thereof interchange their positions, producing the exposure for a given short time and exactly simultaneously for both of the lenses owing to the symmetrical construction of the system. Fig. 6 shows the shape of such a shutter. Actually, this shutter includes, in addition to the two blades 5, 5a which work as above described, two auxiliary blades 6, 6a which can be fixed adjustably with respect to blades 5, 5a so as to vary the time of exposure.

Lenses 4, 4a have exactly the same focal length and they make with each other a suitable angle so that each of them gives an image of the portion of space that corresponds thereto. Thus, they form their images on the same film 7 (shown in dotted lines) which, owing to an arrangement which will be hereinafter described, is given a step by step motion so as to be moved, every time an exposure has been made, a distance equal to the length of two exposed pictures. Film 7 which starts from unwinding spool 8, passes (Fig. 1) on guiding roller 9 and successively behind transparent window 10, on the freely rotating roller 11, behind transparent window 12, on freely rotating roller 13 and it is finally fed by driving roller 14 to the receiving spool 15. The axes of spools 8 and 15 are supposed to be provided with friction means as in conventional photographic apparatus. The two respective pictures are formed by the lenses 4 and 4a on the parts of film 7 located behind windows 10 and 12. During the exposure, the film is kept perfectly flat between said windows and a film pressing member 16.

After every exposure, that is to say after every rotation of shutter 2 as it will be hereinafter described, the film pressing member 16 is lifted, by means of a lever 17 pivoting about an axis 17, so as to enable the film to move forward.

In the example shown by the drawing, the shutter is disposed in front of the lenses but of course equivalent results might be obtained by placing the shutter behind the lenses.

In order to obtain a quick and uniform displacement of the shutter, this movement is obtained by means of a driving spring which is rewound after every exposure by an angle equal to the angle through which the shutter has rotated. The shaft 3 of the shutter is supported in bearings 19, and 20 is the driving spring of this shutter, the spring illustrated being a helical one. But I might of course use any other suitable type of spring.

Of course, when the film is being fed forward, the lenses are hidden by the blades of the shutter which is stopped in this position. Blades 5, 5a and 6, 6a are fixed with respect to one another by means of pins 21, 22 which pass through two holes respectively provided in plate 2a rigid with the blades 5, 5a and in some of the holes provided in plate 2b rigid with blades 6, 6a. These pins may be driven frontwardly and against the action of a spring 23 by pulling a knob 24 located at the front of the apparatus. In order to change the time of exposure, said knob is pulled out, pins 21 and 22 being then disengaged from the holes in which they were present in plate 2b. Knob 24 is rotated in the desired direction then it is released. Spring 23 then causes the pins to engage in some of said holes and thus secures blades 4, 4a with respect to blades 6, 6a.

The speed at which the shutter is rotated about shaft 3 depends exclusively upon the strength of spring 20 and the time of exposure is adjusted in accordance with this speed and with the relative positions of blades 5, 5a, 6, 6a as already stated.

It should be noted that if the apparatus has in some aspects a similarity with a moving picture camera, there is an essential difference in that in a moving picture camera the film spools rotate at a uniform speed and are driven directly by the engine, whereas in the apparatus according to the present invention if a source of energy such as a motor is provided for the operation, said motor is never directly connected with the shutter but serves merely to perform the rewinding of spring 20. In other words, the characteristics of exposure of the pictures are independent of the motor and they may be correct even for the first image when the motor is being started. The conditions of operation of a shutter depend exclusively upon spring 20.

Figure 2:
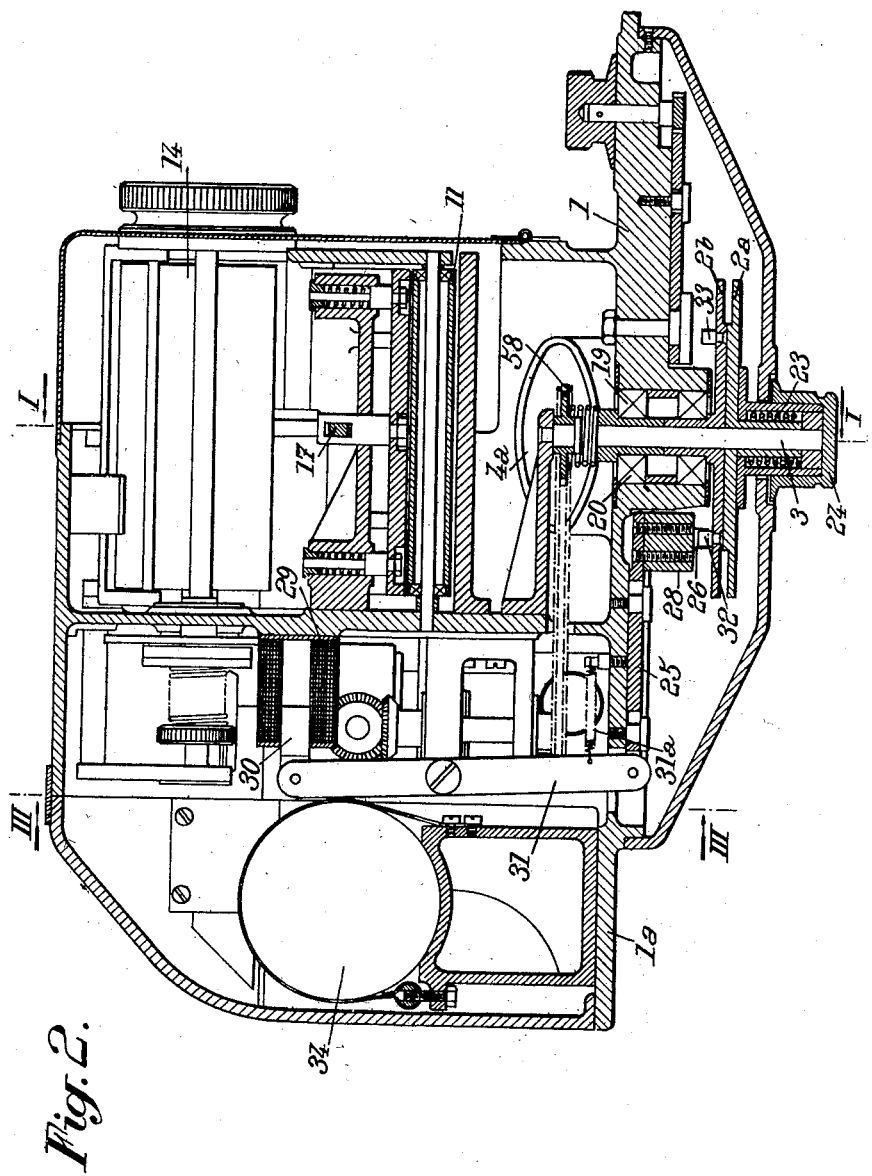
Fig. 2 is a corresponding vertical section on the line II—II of Fig. 1 (bobbin 15 being removed).

In order to control this rotation of the shutter, a sliding plate 25 (Fig. 2 and Fig. 7) is provided with a block 28 carrying abutments 26 and 27. Plate 25 has a sliding movement in opposed directions $f_1$, $f_2$ and these displacements are controlled by an electro-magnet 29 which acts upon a core 30 hinged at one end of a lever 31 the other end of which is connected to plate 25. Pin 32, which is rigid with the plate 2b of the shutter, is urged in the direction of arrow $f_3$ (Fig. 7). At rest it is bearing against abutment 26. If plate 25 is pulled toward the left-hand side of Fig. 7, that is to say in direction $f_1$, abutment 26 is retracted from the path of pin 32 and the shutter is allowed to rotate. It rotates only through half a revolution since another pin 33 carried by said shutter comes into contact with abutment 27 which has moved toward the left. When the electro-magnet ceases to be energized, plate 25 returns to its initial position under the action of spring 31a and pin 33 then comes to rest upon projection 26 in the position initially occupied by pin 32. The shutter can then be operated once more, provided of course its driving spring is rewound.

In a camera as above described, it is necessary to provide a source of energy such as a motor for rewinding the driving spring of the shutter. Furthermore, many other operations must be performed, such as the lifting of the film pressing means when the film is to be moved forward, the release of the shutter and possibly still other signalling or counting operations such as the switching on of a lamp, the moving forward of a counter element, etc.

According to my invention, all these operations are obtained by means actuated from a single camshaft driven through a suitable speed reducing gear by a motor running at a uniform speed.

Figure 5:
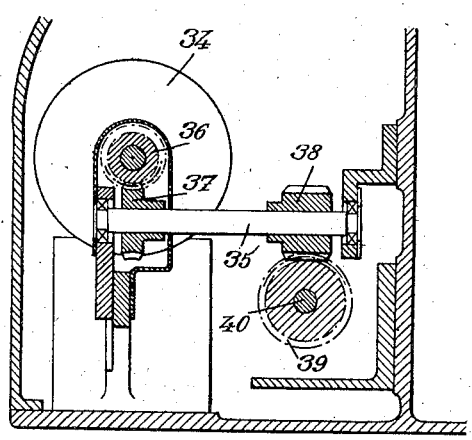

As shown by Fig. 5, the general operation of the camera is obtained from motor 34. This motor rotates either in a continuous fashion or intermittently at intervals controlled by a suitable apparatus. This movement is first transmitted to shaft 35 through gears 36—37, then to shaft 40 through gears 38—39 (see also Fig. 3). These gears, preferably of the worm and worm wheel type, act as speed reducing means. Therefore one revolution of shaft 40, which corresponds to a cycle of exposure, takes place in a relatively long time.

Shaft 40 carries keyed thereon several cams serving to perform the desired operations. By way of example, three such cams are shown at 41, 42 and 43. A cylindrical pinion 44 is also fixed on shaft 40. A wheel 45 in mesh with pinion 44 (the ratio of said two gears being 1/2) transmits the drive to the shutter spring rewinding means.

These spring rewinding means include a Maltese cross mechanism the rotary grooves of which supply a discontinuous movement of the film, these grooves cooperating with two pins carried by a driving wheel having a continuous movement. Such mechanisms are known in the art but they generally include a single pin to drive the Maltese cross, whereas in the present case there are two pins. The Maltese cross remains stationary for one half of every picture taking cycle and it actuates the shutter spring rewinding means and moves the film forward during the other half of said cycle.

Figure 3:
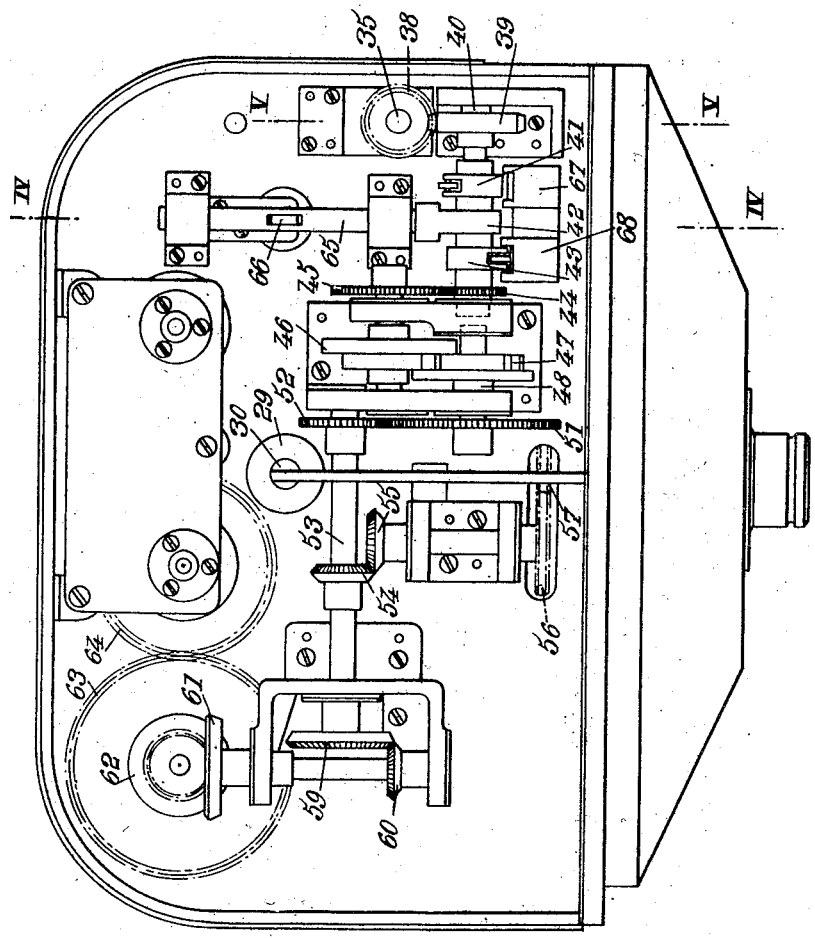
Fig. 3 is a sectional view on the line III—III of Fig. 2, the motor and the cover of the apparatus being removed.

The Maltese cross visible in plan view in Fig. 8 is also shown at 46, 47 on Fig. 3 and it is arranged to impart a discontinuous movement to shaft 48. This discontinuous movement is used, as it will be hereinafter explained, to rewind the shutter driving spring and to move the film forward between two exposures.

As shown by Fig. 8, during the time of every continuous half revolution of plate 46 which carries pins 49 and 50, the grooved Maltese cross 47 makes a quarter of a revolution for one half of this time and remains stationary for the other half (or reversely), whereas in conventional Maltese cross mechanisms for a full continuous revolution of the plate there was a single pin corresponding to one fourth of a revolution of the Maltese cross and which remained stationary during three quarters of the remainder of the cycle.

The period between two successive exposures, called "cycle," corresponds, as above stated, to a full revolution of shaft 40 rotating with a continuous motion. It also corresponds, due to gears 44, 45, to one half revolution of wheel 46 also of the continuous motion. Due to the Maltese cross mechanism, shaft 48 remains stationary during the first half of the cycle, then makes a rotation of one fourth of a revolution during the second half.

Gears 51 and 52 the first one of which is keyed on shaft 48 and the second on a parallel shaft 43 achieve a ratio of transmission equal to 2 so that, during the first half of the cycle, shaft 53 remains stationary, then makes one half revolution during the second half.

This discontinuous motion can easily be used for performing the desired operation.

For instance, owing to a first bevel gear transmission 54, 55, this movement is transmitted to wheel 56 which, through a chain transmission 57, drives wheel 58 (Fig. 1) which rewinds spring 20, said wheel 58 rotating during one half of the cycle through 180°, that is to say exactly through the amount by which the spring has been expanded during the operation of the shutter for the preceding half cycle.

At the same time, as the shutter spring is rewound, bevel gears 59, 60, 61, 62 calculated in suitable manner produce the motive displacement of driving roller 14 and, through pinions 63, 64, that of the receiver spool 15 so as to move the film forward by the necessary distance.

The film pressing means and the shutter operation are controlled from the shaft 40 in the following fashion.

Figure 4:
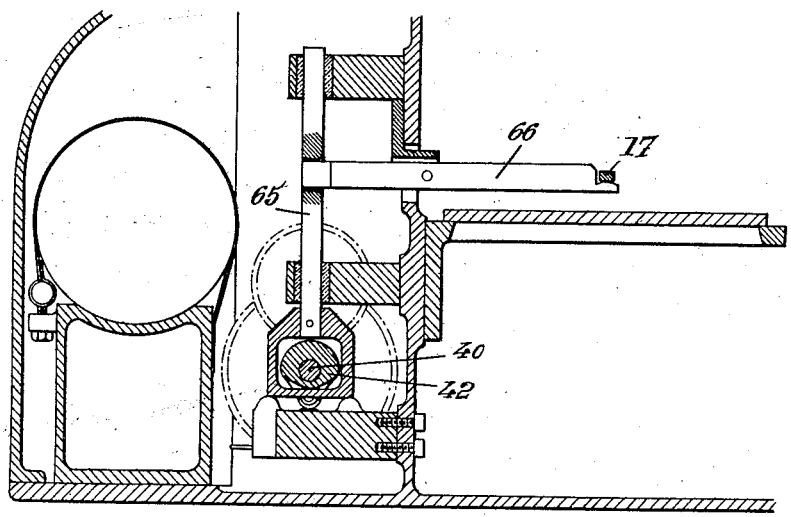
Figs. 4 and 5 are part views respectively on the lines IV—IV and V—V of Fig. 3.

On the one hand, cam 42 carried by shaft 40 transmits to piston 55 (see also Fig. 4) a reciprocating movement. This piston acting upon a lever 66 causes the film pressing means to move first upwardly and then downwardly through lever 17. Cam 42 is fixed on a shaft 40 in such manner that the film pressing means are moved upwardly slightly before the film rewinding cycle and moved down immediately after. On the other hand, it is during the first half of the cycle, when the film is stationary, that a cam carried by shaft 40 (for instance cam 41) establishes contact through an electric switch 67, for instance of the micro-switch type, which sends current into electro-magnet 29 which causes lever 31 to trip and start the operation of the shutter.

Finally, cam 43 acting upon another switch 68 and through any other arrangement of cams and switches (not shown) makes it possible to perform accessory operations such as the switching of lamps, the operation of a counter, etc.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A photographic camera which comprises, in combination, a casing, at least two lenses mounted in said casing, a shutter pivotally mounted in said casing for taking an exposure through said lenses, spring means carried by said casing for rotating said shutter, retractable abutment means for preventing said spring means from rotating said shutter, means for retracting said abutment means, means for rewinding said spring means after every operation thereof including a toothed wheel connected with one end of said spring means, film guiding means carried by said casing, film pressing means movably mounted in said casing to cooperate with said film guiding means, a motor mounted in said casing, said motor arranged to run at uniform speed, a shaft driven by said motor, another shaft journalled in said casing and parallel to said first mentioned shaft, gear means between said two shafts for driving the second one at a speed equal to one half of that of the first one, a Maltese cross mechanism including a driving wheel fixed on said second mentioned shaft, a driven disc provided with four radial grooves at 90° to one another, and two pins carried by said driving wheel at the opposed ends of a diameter thereof, for cooperating with said grooves, a shaft fixed to said driven disc coaxially therewith, a fourth shaft parallel to said last mentioned shaft journalled in said casing, gear means interposed between said two last mentioned shafts for driving the fourth shaft at a speed equal to twice that of said third shaft, a sprocket chain operatively connected with said fourth shaft and in mesh with said rewinding toothed wheel, means operatively connected with said second mentioned shaft for operating said film pressing means and means operatively connected with said second mentioned shaft for operating said abutment retracting means.

2. A camera according to claim 1 in which said abutment retracting means include a reciprocable plate slidably mounted in said casing and carrying said abutment means, an electro-magnet, and link means operative by said electro-magnet for actuating said sliding plate, the means operatively connected with said second mentioned shaft for operating said abutment retracting means being arranged periodically to energize said electro-magnet.

3. A camera according to claim 1 including film driving means operatively connected with said fourth shaft.

4. A camera according to claim 2 including film driving means operatively connected with said fourth shaft.

References Cited in the file of this patent

UNITED STATES PATENTS

| | | |
|---|---|---|
| 2,339,810 | Richards | Jan. 25, 1944 |
| 2,476,576 | Bachelder | July 19, 1949 |
| 2,596,222 | Doyle | May 13, 1952 |